US009525757B2

(12) United States Patent
Negishi

(10) Patent No.: US 9,525,757 B2
(45) Date of Patent: Dec. 20, 2016

(54) INFORMATION PROCESSING APPARATUS THAT CONTROLS CONNECTION OF DEVICES, METHOD OF CONTROLLING THE APPARATUS, AND DEVICE CONTROL SYSTEM

(71) Applicant: CANON IMAGING SYSTEMS INC., Niigata-shi, Niigata (JP)

(72) Inventor: Satoshi Negishi, Niigata (JP)

(73) Assignee: CANON IMAGING SYSTEMS INC., Niigata-shi (JP)

( * ) Notice: Subject to any disclaimer, the term of this patent is extended or adjusted under 35 U.S.C. 154(b) by 694 days.

(21) Appl. No.: 13/655,564

(22) Filed: Oct. 19, 2012

(65) Prior Publication Data

US 2013/0103840 A1 Apr. 25, 2013

(30) Foreign Application Priority Data

Oct. 21, 2011 (JP) ................................ 2011-232230

(51) Int. Cl.
*G06F 15/173* (2006.01)
*H04L 29/08* (2006.01)
*G06F 15/16* (2006.01)

(52) U.S. Cl.
CPC ............. *H04L 67/34* (2013.01); *H04L 67/025* (2013.01)

(58) Field of Classification Search
CPC .......... H04L 67/00; H04L 29/00; H04L 67/34; H04L 67/025
USPC ........................................................ 709/227
See application file for complete search history.

(56) References Cited

U.S. PATENT DOCUMENTS

| 6,470,397 B1 * | 10/2002 | Shah | G06F 3/0626 709/250 |
| 6,857,004 B1 * | 2/2005 | Howard | G06F 9/5044 709/201 |
| 7,254,813 B2 * | 8/2007 | Leong | G06F 3/0601 710/5 |

(Continued)

FOREIGN PATENT DOCUMENTS

JP 2011-129111 A 6/2011

OTHER PUBLICATIONS

"Managing Devices in Windows XP," Editors of Microsoft Site, Nov. 3, 2005.*
Office Action issued in JP2011-232230, mailed Jul. 21, 2015.

*Primary Examiner* — Melvin H Pollack
(74) *Attorney, Agent, or Firm* — Rossi, Kimms & McDowell LLP

(57) ABSTRACT

An information processing apparatus which is capable of performing device connection control for connection to more devices than the maximum connectable devices defined by the device interface standard or the SDK. A device server communication module generates communication threads for controlling data communication with device servers according to requests from higher-layer software. Each communication thread generates a device stack for controlling a device via an associated device server connected thereto in such a manner as if the device were directly connected to the apparatus. When a connection notification indicative of connection with the device is received, the communication thread attempts to detect a device stack in a non-data transmission and reception state from the device stacks, and connects to the device server via the detected device stack to perform data transmission and reception.

16 Claims, 10 Drawing Sheets

(56) References Cited

U.S. PATENT DOCUMENTS

| | | | | |
|---|---|---|---|---|
| 8,001,553 B2* | 8/2011 | Li | ................. | G06F 9/4411 |
| | | | | 719/324 |
| 8,429,630 B2* | 4/2013 | Nickolov | ............. | G06F 9/4856 |
| | | | | 717/110 |
| 8,793,284 B2* | 7/2014 | Perrin | ................ | G06F 7/00 |
| | | | | 707/801 |
| 9,032,396 B2* | 5/2015 | Nakashima | ...... | H04N 21/25808 |
| | | | | 717/174 |
| 9,032,477 B2* | 5/2015 | Ranjan | ................. | G06F 21/57 |
| | | | | 726/2 |
| 9,058,138 B2* | 6/2015 | St. Laurent | ........... | G06F 3/1204 |
| 9,088,464 B2* | 7/2015 | Shizuno | ............ | H04L 29/12301 |
| 9,094,210 B2* | 7/2015 | Frost | ................. | G06F 9/45558 |
| 9,104,438 B2* | 8/2015 | Dawson | ............... | G06F 9/4443 |
| 9,116,715 B2* | 8/2015 | von Eicken | ............... | G06F 8/63 |
| 9,131,084 B2* | 9/2015 | Ohishi | ............. | H04N 1/00222 |
| 9,134,944 B1* | 9/2015 | Platt | ..................... | G06F 3/1204 |
| 9,166,873 B2* | 10/2015 | Allred | .................. | H04L 29/125 |
| 9,185,554 B2* | 11/2015 | Nagpal | ................ | H04W 8/245 |
| 9,195,449 B1* | 11/2015 | Urbach | ............... | G06F 9/44521 |
| 9,210,238 B2* | 12/2015 | Loach | .................... | H04L 47/17 |
| 9,213,587 B2* | 12/2015 | Powlette | .................. | G06F 9/54 |
| 2003/0033345 A1* | 2/2003 | Keefer | ................. | G06F 9/5072 |
| | | | | 718/102 |
| 2003/0227644 A1* | 12/2003 | Ferlitsch | .............. | G06F 3/1203 |
| | | | | 358/1.13 |
| 2005/0179936 A1* | 8/2005 | Sedky | .................. | G06F 3/1213 |
| | | | | 358/1.15 |
| 2010/0279733 A1* | 11/2010 | Karsten | ................ | H04W 48/18 |
| | | | | 455/552.1 |
| 2013/0083800 A1* | 4/2013 | Lezama Bounine | ..................... | |
| | | | | H04L 12/2859 |
| | | | | 370/401 |

* cited by examiner

006# INFORMATION PROCESSING APPARATUS THAT CONTROLS CONNECTION OF DEVICES, METHOD OF CONTROLLING THE APPARATUS, AND DEVICE CONTROL SYSTEM

BACKGROUND OF THE INVENTION

Field of the Invention

The present invention relates to an information processing apparatus that communicates with various devices via a network, a method of controlling the apparatus, and a device control system.

Description of the Related Art

Conventionally, there has been known a system in which an information processing apparatus, such as a personal computer (hereinafter referred to as a PC), as a client, uses a device (peripheral device), such as a printer, a storage, or a scanner, via a network. In such a system, there has been proposed one in which a client virtually recognizes a device on a network as a device locally connected thereto, whereby it is made possible to access the device from the client on the network.

The present assignee has proposed a client apparatus and a device control system in which device connection control is performed such that the client forms device stacks for controlling the devices via device servers, thereby making it possible to connect the devices up to the maximum number of connectable devices defined by a device interface standard or by a SDK (Software Development Kit) provided by a manufacturer or a vendor as a program (function) necessary for device control (see Japanese Patent Laid-Open Publication No. 2011-129111).

However, when a user desires to control a lot of devices existing on the network, in spite of a sufficient processing capacity (specifications) of the PC, if the maximum number of connectable devices is limited by the device interface standard or the SDK, it is impossible to control more devices than the limited number of connectable devices. For this reason, it is desired that the client apparatus and the device control system in Japanese Patent Laid-Open Publication No. 2011-129111, which has been proposed by the present assignee, are further expanded and developed in function to thereby make it possible to perform device control connection such that more than the maximum connectable devices defined by the device interface standard or the SDK can be connected.

SUMMARY OF THE INVENTION

The present invention provides an information processing apparatus which is capable of performing device connection control for connection to more devices than the maximum connectable devices defined by the device interface standard or the SDK, a method of controlling the information processing apparatus, and a device control system.

In a first aspect of the present invention, there is provided an information processing apparatus that is connected via a network to device control units having devices locally or internally connected thereto, comprising a communication thread control unit configured to generate communication threads for controlling data communication with the device control units, according to requests from higher-layer software, the communication threads generating device stacks for controlling the devices via the device control units in such a manner as if the devices were directly connected to the information processing apparatus, wherein upon receipt of a connection notification indicative of connection with one of the devices, one of the communication threads performs detection of a device stack in a non-data transmission and reception state from the device stacks, and connects to an associated one of the device control units connected to the one of the devices via the detected device stack, to thereby perform data transmission and reception.

In a second aspect of the present invention, there is provided a device control system comprising device control units that are connected to a network, devices that are locally or internally connected to the device control units, respectively, an information processing apparatus connected to the device control units via the network, including a communication thread control unit configured to generate communication threads for controlling data communication with the device control units, according to requests from higher-layer software, the communication threads generating device stacks for controlling the devices via the device control units in such a manner as if the devices were directly connected to the information processing apparatus, wherein upon receipt of a connection notification indicative of connection with one of the devices, one of the communication threads performs detection of a device stack in a non-data transmission and reception state from the device stacks, and connects to an associated one of the device control units connected to the one of the devices via the detected device stack in the non-data transmission and reception state, to thereby perform data transmission and reception, wherein the information processing apparatus performs data communication by controlling any one of the devices via an associated one of the device control units connected thereto.

In a third aspect of the present invention, there is provided a method of controlling an information processing apparatus that is connected via a network to device control units having devices locally or internally connected thereto, comprising generating communication threads for controlling data communication with the device control units, according to requests from higher-layer software, causing the communication threads to generate device stacks for controlling the devices via the device control units in such a manner as if the devices were directly connected to the information processing apparatus, and causing, upon receipt of a connection notification indicative of connection with one of the devices, one of the communication threads to perform detection of a device stack in a non-data transmission and reception state from the device stacks, and connect to an associated one of the device control units connected to the one of the devices via the detected device stack in the non-data transmission and reception state, to thereby perform data transmission and reception.

According to the present invention, when the information processing apparatus performs data communication with devices via device control units, it is possible to execute device connection control while enabling the information processing apparatus to exhibit effective performance without limiting the number of devices to the maximum number of connectable devices defined by the device interface standard or the SDK.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. In the following description, a personal computer (PC) will be described as an example of an information processing apparatus.

Figure 1:
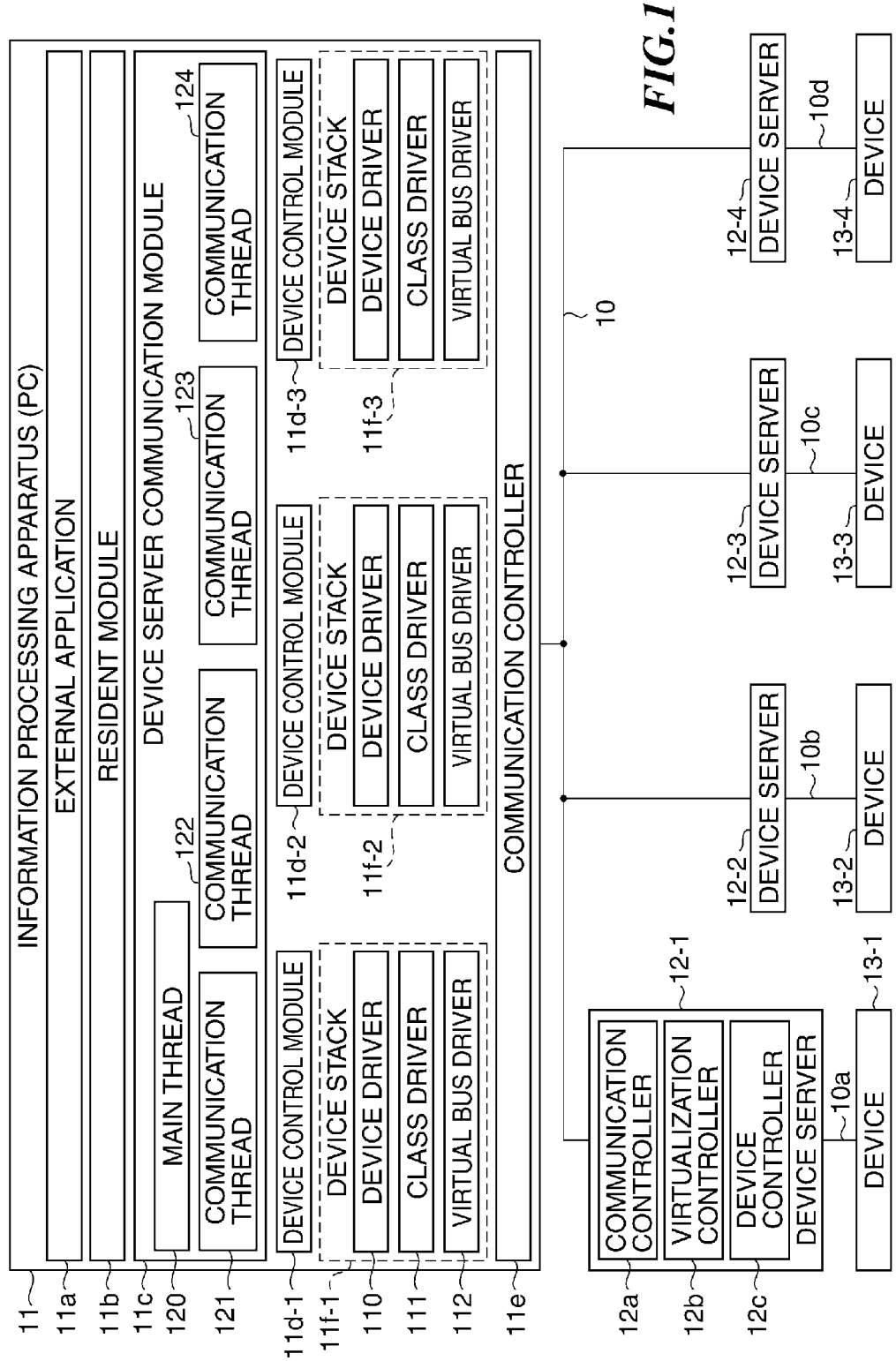
FIG. 1 is a block diagram of a device control system using an example of an information processing apparatus according to a first embodiment of the present invention.

FIG. 1 is a block diagram of a device control system using an information processing apparatus according to a first embodiment of the present invention.

The information processing apparatus, denoted by reference numeral 11, is configured to be connectable to device servers 12-1 to 12-n (n=4 in the illustrated example) via a network 10, such as a LAN (local area network). The network 10 may be formed by either of a wired communication line and a wireless communication.

Further, devices 13-1 to 13-4 as input/output devices each having a general-purpose interface are locally connected to the device servers 12-1 to 12-4 by connection cables 10a to 10d, respectively. Here, although an example will be described in which each device is connected to an associated one of the device servers via a USB (universal serial bus) interface, this is not limitative, but for example, an interface compliant with another type of interface standard, such as the HDMI or Thunderbolt may be used.

The devices 13-1 to 13-4 each are an input/output device having a general-purpose interface (USB interface in the present embodiment). For example, the devices 13-1 and 13-4 each may be an input device, such as a keyboard, a mouse, or a card reader, a display device (output device), a single-function peripheral device, such as a printer, or a multifunction peripheral device equipped with not only a print function but also a scan function, a copy function, a storage function, and so forth, or may be an input/output device other than the above-mentioned devices. The device servers 12-1 to 12-4 may be provided integrally, as a single unit, with the devices 13-1 to 13-4 to which the respective device servers are connected.

Although in the example shown in FIG. 1, only one information processing apparatus is connected, the device control system may be configured such that a plurality of information processing apparatuses are connected to the network 10. Further, although one device is connected to each device server, the device control system may be configured such that a plurality of devices are connected to each device server.

The information processing apparatus 11 shown in FIG. 1 as an example of the information processing apparatus according to the present invention is an apparatus, such as a PC (personal computer), which comprises a CPU, an input section, a display section, a memory, a communication section, and an external storage section (none of which are shown), which are interconnected via an internal bus, and is capable of communicating with the device servers 12-1 to 12-4 via the network 10.

The external storage section stores not only software components, such as an operating system (hereinafter referred to as the OS), not shown, an external application 11a, a resident module 11b, a device server communication module 11c, device control modules 11d-1 to 11d-3, device stacks 11f-1 to 11f-3, and a communication controller 11e, but also various kinds of data. Each of the software components and the various kinds of data is read into the memory under the control of the CPU and OS, whereby various control processes are executed.

The external application 11a is a software component for issuing a request to one of the devices 13 (such as an activation request, a connection request, or a termination request) or a request responsive to a user's operation, via the resident module 11b, and obtaining a result to the request.

The resident module 11b is a software component which is always on standby or in operation during operation of the OS, and activates the device server communication module 11c and the communication controller 11e to transmit and receive data to and from the device servers 12-1 to 12-4 existing on the network. Further, the resident module 11b detects the device servers 12 and the devices 13-1 to 13-4 locally connected to the device servers 12, respectively, and acquires device server information on the device servers 12 and device information on the devices 13.

The device server communication module 11c is a software component activated by the resident module 11b, for independently controlling communication with the device servers 12-1 to 12-4 by a main thread 120 and by respective communication threads 121 to 124, and managing the number of communication threads, the number of device stacks (described hereinafter), and information on the communication state of each device stack (e.g. whether or not the device stack is in a data transmission and reception state).

The main thread 120 (communication thread control unit) is a software component for generating and starting the communication threads 121 to 124, and controlling communication with the device servers 12 under the control of the external application 11a, the OS, and the resident module 11b, which are the higher-layer software.

Each of the communication threads 121 to 124 is a program for independently executing control of communication with an associated one of the device servers 12-1 to 12-4 to which the respective devices 13 (13-1 to 13-4) are connected, and is generated for each device 13 (one of 13-1 to 13-4) to be controlled, using an activation request from the external application 11a as a trigger. Although in FIG. 1, four communication threads are generated, the number of communication threads to be generated is not limited to four, but more than four communication threads may be generated.

Each generated communication thread uniquely identifies a device driver 110, a class driver 111, and a virtual bus driver 112 necessary for data transmission and reception to and from the associated device 13 (one of 13-1 to 13-4) based on the device information acquired by the resident module 11b, and sequentially and dynamically generates the identified driver software. These driver software components (the device driver 110, class driver 111, and virtual bus driver 112) are collectively referred to as the device stack. In FIG. 1, the three device stacks 11f-1 to 11f-3 are generated.

Note that the number of the generable device stacks is fixed, and it is possible to generate as many device stacks as the upper limit of the number of connectable devices (hereinafter referred to as the maximum connectable number) defined by the device interface standard or the SDK. For example, the maximum connectable number defined by the USB interface standard is equal to 127, and hence 127 device stacks can be generated according to the USB interface standard. In the present embodiment, the description will be given assuming that the maximum number of connectable devices is three, i.e. the three device stacks can be generated, for convenience sake.

Further, when the devices are different in model, device stacks compatible with respective models are generated and activated. In this case as well, the number of generable device stacks is equal to the above-mentioned maximum connectable number.

Further, when each of the communication threads 121 to 124 receives a connection notification indicative of a change in the operating state (status) of an associated one of the devices 13 via the external application 11a or an associated one of the device servers 12, the communication thread detects a device stack 11f in a state in which data transmission and reception with any of the device servers 12 is not being executed (hereinafter referred to as the non-data transmission and reception state). More specifically, whether or not a device stack is in the non-data transmission and reception state is determined based on information on the states of communication of the device stacks with the device servers, managed by the device server communication module 11c. Then, if a device stack 11f determined to be in the non-data transmission and reception state is detected, switching is notified to the virtual bus driver 112 of the determined device stack 11f, whereby the data communication path is switched so as to connect to the determined device stack 11f. Then, the communication thread starts an independent session with an associated device server 12 connected via the device stack 11f, and when the data transmission and reception is completed, instructs the associated device server 12 to terminate the session.

The number of communication threads and the number of device stacks are not always equal to each other, and if the number of device stacks is equal to the maximum connectable number, no communication threads (121 to 124) generate a new device stack.

The device control modules 11d-1 to 11d-3 are software components which are started by the device server communication module 11c in association with the device stacks 11f, respectively, for example, such that the device control module 11d-1 is started in association with the device stack 11f-1, the device control module 11d-2 is activated in association with the device stack 11f-2, and the device control module 11d-3 is activated in association with the device stack 11f-3. Then, the device control modules 11d-1 to 11d-3 operate in combination with the device stacks 11f-1 to 11f-3, respectively, forming respective pairs, via the SDK, not shown, to thereby independently control the devices 13-1 to 13-4, respectively.

When a session with one of the device servers 12 is started by one of the communication threads (121 to 124), a data transmission and reception start notification is sent to the communication thread to thereby start the control for data transmission and reception to and from the device server 12 (one of 12-1 to 12-4) via a connected one of the device stacks 11f (11f-1 to 11f-3), and when the data transmission and reception is terminated, a data transmission and reception completion notification is sent to the communication thread.

Next, the software components forming each device stack 11f (11f-1 to 11f-3) will be described.

The device driver 110 is a software component for generating a control command to a connected one of the devices 13 (13-1 to 13-4) according to an instruction from the OS, the external application 11a, or one of the device control modules 11d-1 to 11d-3, to thereby execute data transmission and reception. Further, the device driver 110 waits for a response to the control command (i.e. result of the data transmission and reception) from the connected one of the devices 13 (13-1 to 13-4), and notifies the connected one of the device control modules 11d (11d-1 to 11d-3) of the response.

The class driver 111 (USB class driver in the present embodiment) includes a USB port, not shown, for transmitting and receiving a control command, converts the control command generated by an associated one of the device control modules 11d (11d-1 to 11d-3) or the device driver 110 to USB packets, and sends the USB packets to the virtual bus driver 112. Further, the class driver 111 converts USB packets to a control command, and passes the control command to the associated one of the device control modules 11d (11d-1 to 11d-3) or the device driver 110.

The virtual bus driver 112 (USB virtual bus driver in the present embodiment) is a software component for controlling an connected one of the devices 13 connected to the device servers 12, respectively, via the communication controller 11e, in such a manner as if the device 13 were directly connected to the information processing apparatus 11 by local connection.

The communication controller 11e is connected to the network 10 to control communication with the device servers 12.

The device servers 12 (12-1 to 12-4) each, as an example of a device control unit, comprise a CPU, a memory, a communication section, a local interface (USB interface in the present embodiment), and an external storage section, none of which are shown, which are interconnected via an internal bus, and are capable of communicating with the information processing apparatus 11 via the network 10, and transmitting and receiving data to and from the locally connected devices 13-1 to 13-4 via the connection cables, respectively.

The external storage section stores not only software components, such as an OS (not shown), a communication controller 12a, a virtualization controller 12b, a device controller 12c, and so forth, but also various kinds of data. Each of the software components and the various kinds of data is read into the memory under the control of the CPU, whereby various control processes are executed.

The communication controller 12a is connected to the network 10 to control communication with the information processing apparatus 11. The virtualization controller 12b communicates with an associated one of the virtual bus drivers 112 of the information processing apparatus 11 via the communication controller 12a and controls the associated device controller 12c. The device controller 12c controls an associated one of the devices 13 (13-1 to 13-4) connected via the USB interface.

In the device control system configured as above, the information processing apparatus 11 remotely controls the device controller 12c via the virtualization controller 12b of each device server 12 by the associated virtual bus driver 112, whereby the information processing apparatus 11 can control the devices 13 (13-1 to 13-4) in such a manner as if the devices 13 (13-1 to 13-4) were directly connected to the information processing apparatus 11 by local connection (virtualization control).

Further, the device servers 12 (12-1 to 12-4) each acquire the device information (device identification information, device configuration, a type, and so forth) from a locally connected one of the devices 13 (13-1 to 13-4) by the device controller 12c, respectively, and transmit the acquired device information and the device server information (server identification information, server setting information, and so forth) which is information on itself to the information processing apparatus 11.

The device information and the device server information may be acquired via each device server 12 according to a request from the information processing apparatus 11, or may be sent to the information processing apparatus 11 by transmitting the device information and the device server information from each device server 12 to the information processing apparatus 11 when the device server 12 is turned on or has its settings changed.

Figure 2:
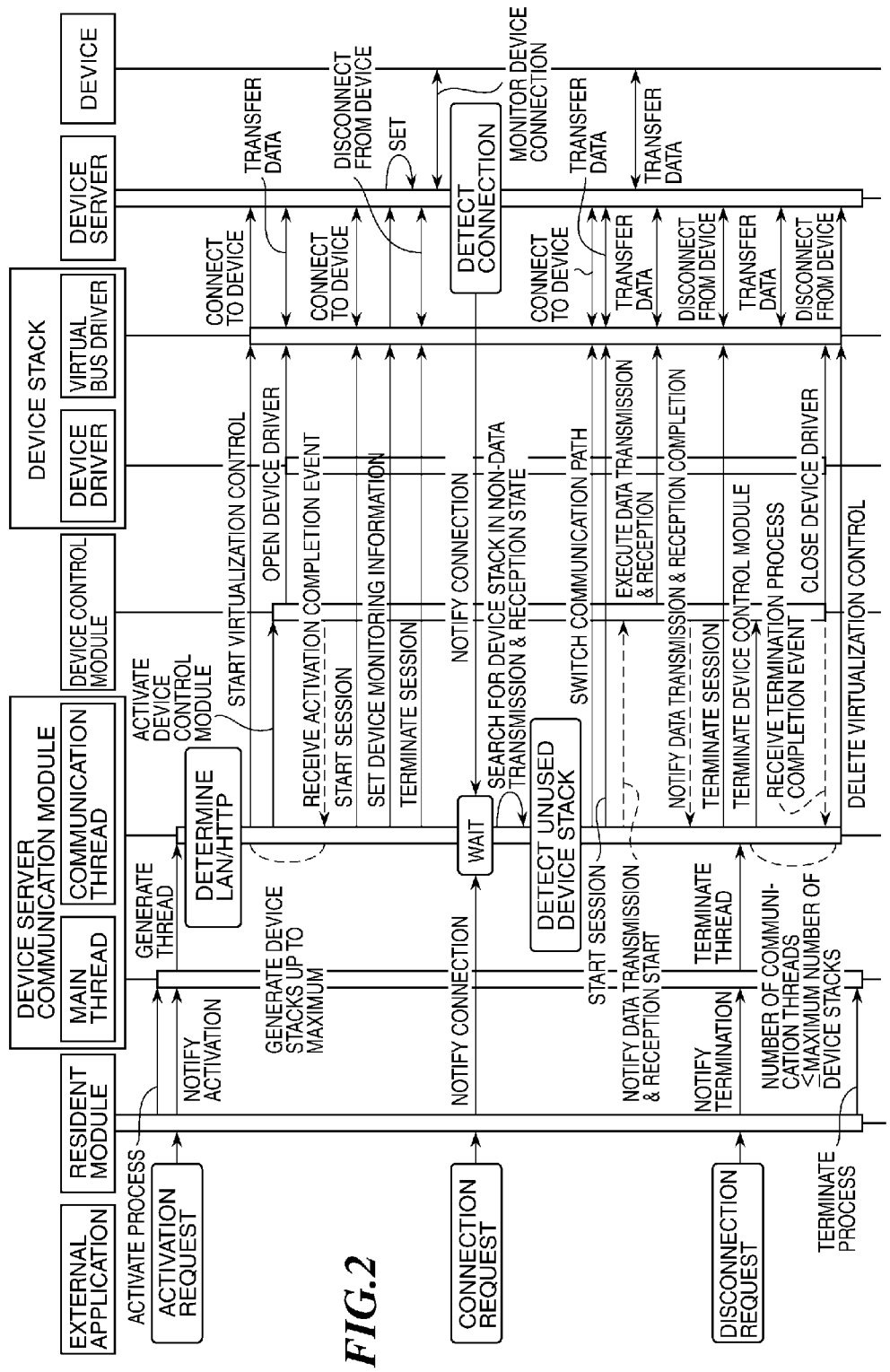
FIG. 2 is a sequence diagram useful in explaining data transmission and reception in the device control system shown in FIG. 1.

FIG. 2 is a sequence diagram useful in explaining data transmission and reception in the device control system shown in FIG. 1. Note that it is assumed that the information processing apparatus 11 has already acquired the device server information and the device information.

Figure 3:
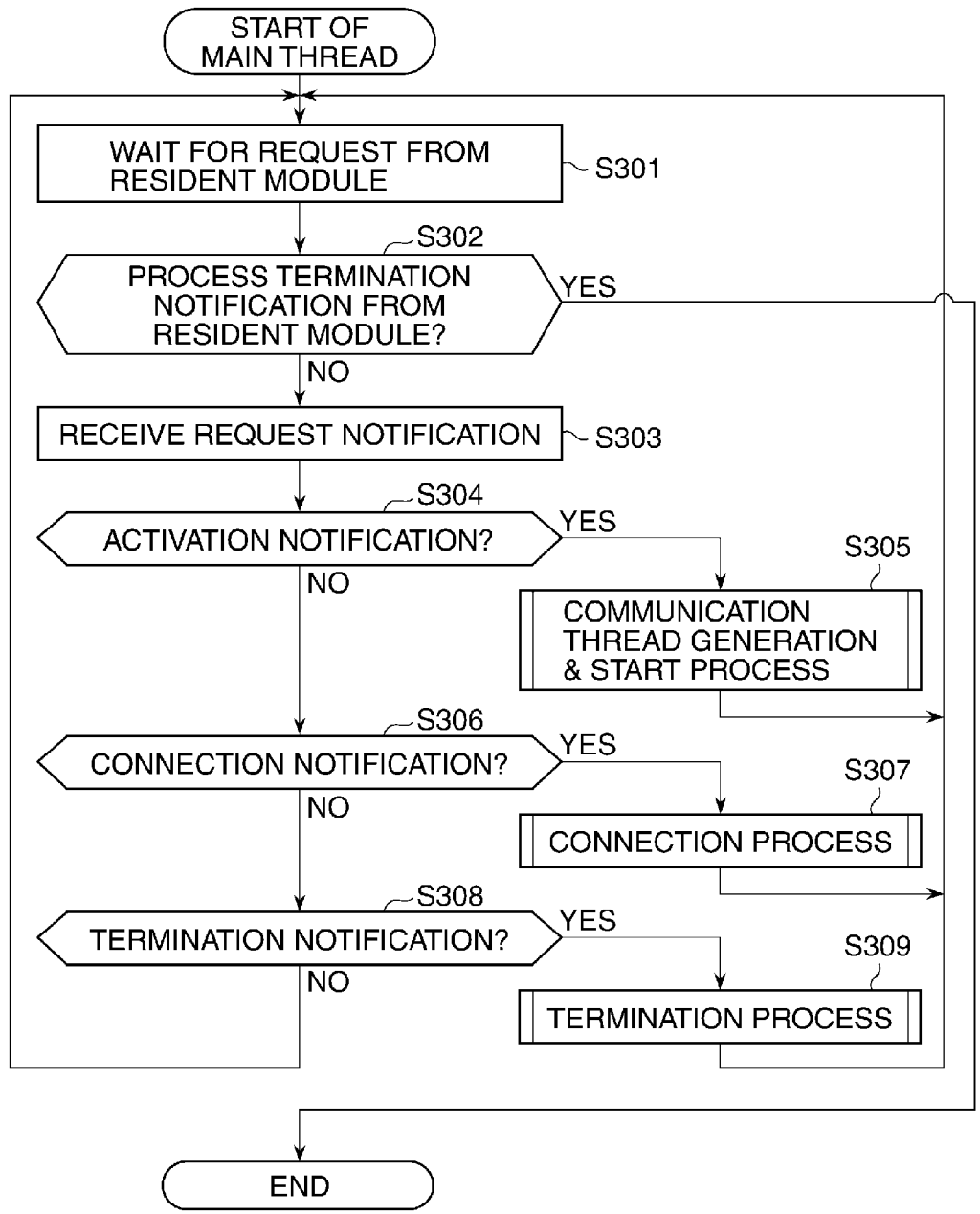
FIG. 3 is a flowchart of a communication process executed by a device server communication module of the information processing apparatus appearing in FIG. 1.

FIG. 3 is a flowchart of a communication process executed by the main thread 120 of the device server communication module 11c of the information processing apparatus 11 appearing in FIG. 1, which will be described hereafter with reference to the sequence diagram in FIG. 2.

The resident module 11b activates the device server communication module 11c by a process start notification. When the device server communication module 11c is started, the main thread 120 is started, and the main thread 120 enters a wait state waiting for a request (such as an activation request, a connection request, or a termination request) from the resident module 11b (step S301).

Then, upon receipt of a request from the resident module 11b during this wait state, the device server communication module 11c determines whether or not the request is a process termination notification from the resident module 11b (step S302). If it is determined that the request is a process termination notification (YES to the step S302), the process by the device server communication module 11c i.e. the present communication process is terminated. On the other hand, if the request is not a process termination notification (NO to the step S302), the main thread 120 receives a notification of a request (such as a start request, a connection request, or a termination request) sent from the external application 11a to the device 13 (step S303). Hereinafter, the above notification of the request is referred to as the request notification.

Next, a process for determining the received request notification is executed. First, the device server communication module 11c determines whether or not the request notification is an activation notification (step S304).

If it is determined that the request notification is a "start notification" (YES to the step S304), the main thread 120 generates one of the communication threads (121 to 124) which performs data communication control with the device servers 12 (12-1 to 12-4), and starts the generated communication thread (step S305). Moreover, the main thread 120 performs the data communication control independently for each communication thread. Then, the process returns to the step S301.

Figure 4:
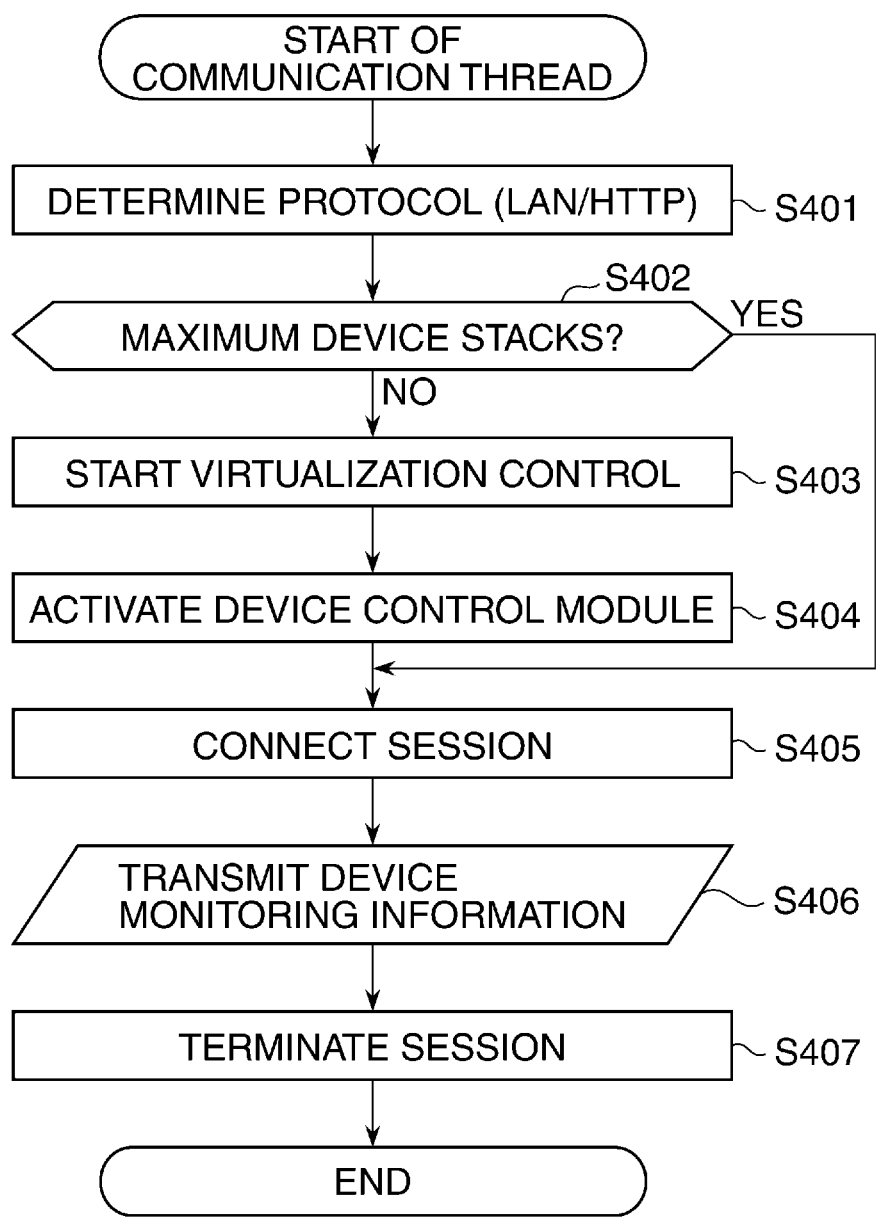
FIG. 4 is a flowchart of a communication thread generation and start process in the communication process shown in FIG. 3.

FIG. 4 is a flowchart of the communication thread generation and start process executed in the step S305 in FIG. 3.

When the main thread 120 receives the activation notification sent from the resident module 11b according to the activation request from the external application 11a, the main thread 120 generates the communication thread, and the generated communication thread determines a communication protocol used for communication with an associated one of the device servers 12. For example, it is determined whether to use a protocol for communication via a LAN (local area network) or a protocol e.g. an HTTP (hypertext transfer protocol), for communication via an external network, such as the Internet (step S401). In the present embodiment, communication is assumed to be performed using the protocol for communication via the LAN, and hence, the following description is given assuming that the communication thread is connected to the associated device server 12 via the LAN.

Next, in the communication thread, it is determined whether or not the number of existing device stacks 11f is equal to the defined maximum connectable number (three in the present embodiment) (step S402). Then, if the number of existing device stacks 11f is less than the defined maximum connectable number (three) (NO to the step S402), the device stack 11f is newly generated based on the device information acquired by the resident module 11b to start the above-mentioned virtualization control (step S403).

Note that before generating a device stack, detection of a device stack in a non-data transmission and reception state, described hereinafter, may be performed, and the device stack may be generated when such a device stack in the non-data transmission and reception state is not detected (does not exist).

Next, the communication thread (one of 121 to 124) starts one of the device control modules 11d in accordance with the device stack 11f generated in the step S403 (step S404), and when a notification of an activation completion event is received from the associated device control module 11d, the communication thread instructs the communication controller 11e to establish a session with the associated one of the device servers 12 (step S405).

Then, when the session is established, the associated communication thread (one of 121 to 124) transmits device monitoring information (described hereinafter) to the device server 12 (step S406). Then, when the device monitoring information has been transmitted to the device server 12, the associated communication thread (one of 121 to 124) instructs the communication controller 11e to terminate the session (step S407), and when the session with the device server 12 is terminated, the associated communication thread (one 121 to 124) disconnects from the device, and waits for an instruction from the resident module 11b or the main thread 120.

In the step S402, if the number of existing device stacks 11f is equal to the maximum connectable number (three) (YES to the step S402), the process directly proceeds to the step S405.

On the other hand, the device server 12 having received the device monitoring information from the information processing apparatus 11 in the step S406 monitors the operating state of the device 13 locally connected thereto based on the received device monitoring information. Then, if a change in the operating state of the device 13 (state change) is detected, the device server 12 notifies the information processing apparatus 11 of the detection of the state change (connection notification).

Here, the state change is caused e.g. by performing an operation for reading a card (acquiring a user ID) on a card reader (device), or depressing an operation button of the device, but it is not limited to these.

Note that the device monitoring information is intended to mean a pair of monitoring programs (monitoring information) for executing monitoring of each device 13, and is different on a device model basis. The device monitoring information may be introduced to the device servers 12 in advance, or only necessary data may be acquired e.g. from the information processing apparatus 11.

Referring again to FIG. 3, if it is determined in the step S304 that the request notification is not an "activation notification" (NO to the step S304), the main thread 120 determines whether or not the request notification is a "connection notification" (step S306). If the request notification is a "connection notification" (YES to the step S306), the main thread 120 causes the communication thread (121 to 124) to start a connection process (step S307), and returns to the step S301.

Figure 5:
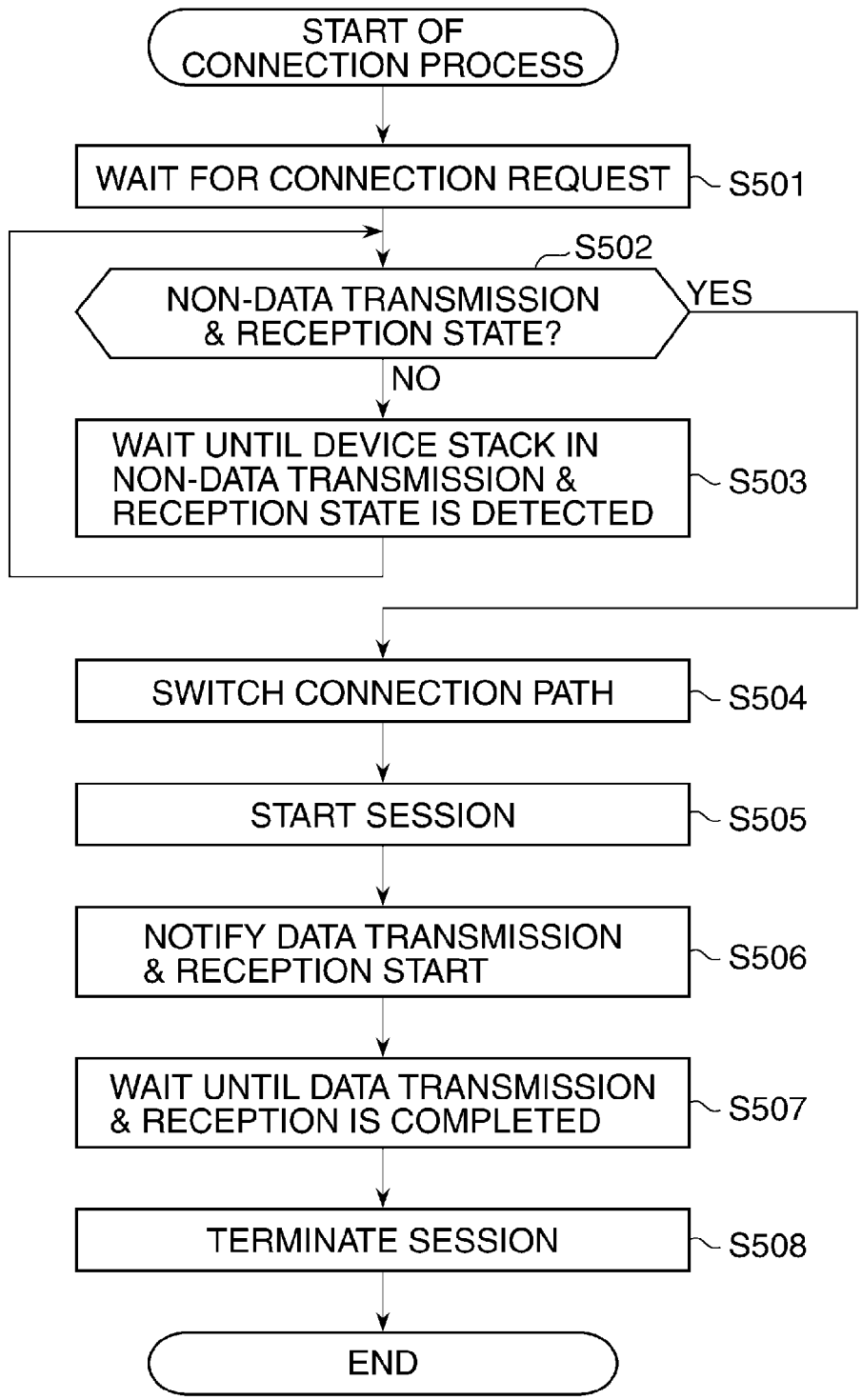
FIG. 5 is a flowchart of a connection process in the communication process shown in FIG. 3.

FIG. 5 is a flowchart of the connection process executed in the step S307 in FIG. 3.

After being generated and started by the main thread 120, the communication thread (the communication thread 124, for example) enters the wait state waiting for an instruction from the resident module 11b or the main thread 120, or a connection notification from one of the device servers 12-1 to 12-4 (step S501).

Then, if a connection notification is received from the external application 11a via the resident module 11b, or from one of the device servers (12-1 to 12-4), the communication thread 124 detects whether there is a device stack in the non-data transmission and reception state among the device stacks 11f (step S502).

At this time, if all of the device stacks 11f (11f-1 to 11f-3) are in the data transmission and reception state (NO to the step S502), the communication thread 124 enters the wait state until a device stack in the non-data transmission and reception state is detected (step S503), and the process returns to the step S502.

On the other hand, if a device stack in the non-data transmission and reception state is detected (YES to the step S502), the communication thread 124 switches the data communication path so as to connect to the detected device stack in the non-data transmission and reception state (e.g. the device stack 11f-2) (step S504).

Next, the communication thread 124 causes the device server (12-4, assumed here by way of example) connected via the device stack 11f-2 in the non-data transmission and reception state to start an independent session (step S505), and when the session is started, the device control module 11d-2 sends a data transmission and reception start notification to the communication thread 124 (step S506).

Upon receipt of the data transmission and reception start notification, the device control module 11d-2 controls the communication thread 124 to transmit and receive data to and from the device 13-4 via the device server 12-4 through the device stack 11f-2.

The communication thread 124 waits until the data transmission and reception controlled by the device stack 11f-2 is completed (step S507), and when a data transmission and reception completion notification is received from the device control module 11d-2, the communication thread 124 causes the communication controller 11e to terminate the session with the device server 12-4 via the device stack 11f-2 (step S508).

Figure 6:
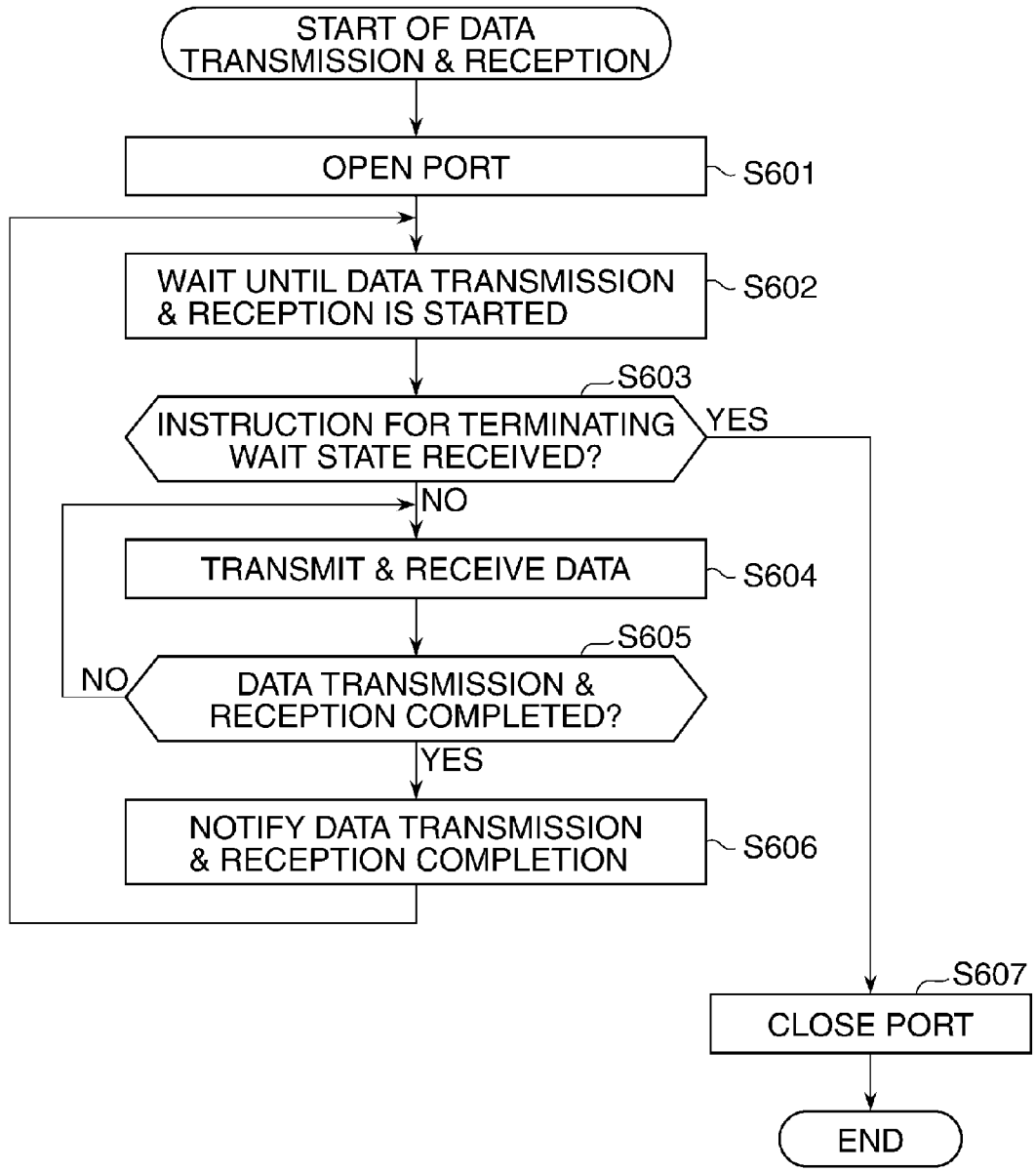
FIG. 6 is a flowchart of a data transmission and reception process executed by a device control module appearing in FIG. 1.

FIG. 6 is a flowchart of the data transmission and reception control process executed by the device control module 11d in the steps S506 and S507 in FIG. 5.

The device control module 11d (11d-2 in the present example) has been activated in association with the device stack 11f (11f-2 in the present example). For example, the device control module 11d-2 opens a communication port for transmitting and receiving data according to an instruction from the communication thread 124 (step S601), waits until a data transmission and reception start notification is received from the communication thread 124 (step S602), and performs determination whether a notification from the communication thread 124 is an instruction for terminating the data transmission and reception wait state (step S603).

When the device control module 11d-2 receives not the instruction for terminating the data transmission and reception wait state but the data transmission and reception start notification from the communication thread 124 (NO to the step S603), the device control module 11d-2 causes the device stack 11f-2 to start the data transmission and reception to and from the device 13-4 via the device server 12-4 (step S604), and performs data transmission and reception control such that as long as the data transmission and reception is not completed (NO to the step S605), the step S604 is repeatedly executed. Then, when the data transmission and reception is completed (YES to the step S605), the device control module 11d-2 transmits a data transmission and reception completion notification to the communication thread 124 (step S606). Then, the process returns to the step S602.

On the other hand, when the instruction for terminating the data transmission and reception wait state is received from the communication thread 124 (YES to the step S603), the device control module 11d-2 closes the communication port which has been opened (step S607), and sets the device stack 11f-2 to the non-data transmission and reception state.

Here, the device stack 11f-2 is only shifted to the non-data transmission and reception state, and is set in a state allowing another communication thread to immediately use the same without being terminated (deleted) until a disconnection request (described hereinafter) is received e.g. as an instruction from the external application 11a.

Referring again to FIG. 3, if it is determined in the step S306 that the request notification is not a "connection notification" (NO to the step S306), the main thread 120 of the device server communication module 11c determines whether or not the request notification is a "termination notification" (step S308). If the request notification is a "termination notification" (YES to the step S308), the device server communication module 11c executes a termination process, described hereinafter (step S309), and the process returns to the step S301.

Figure 7:
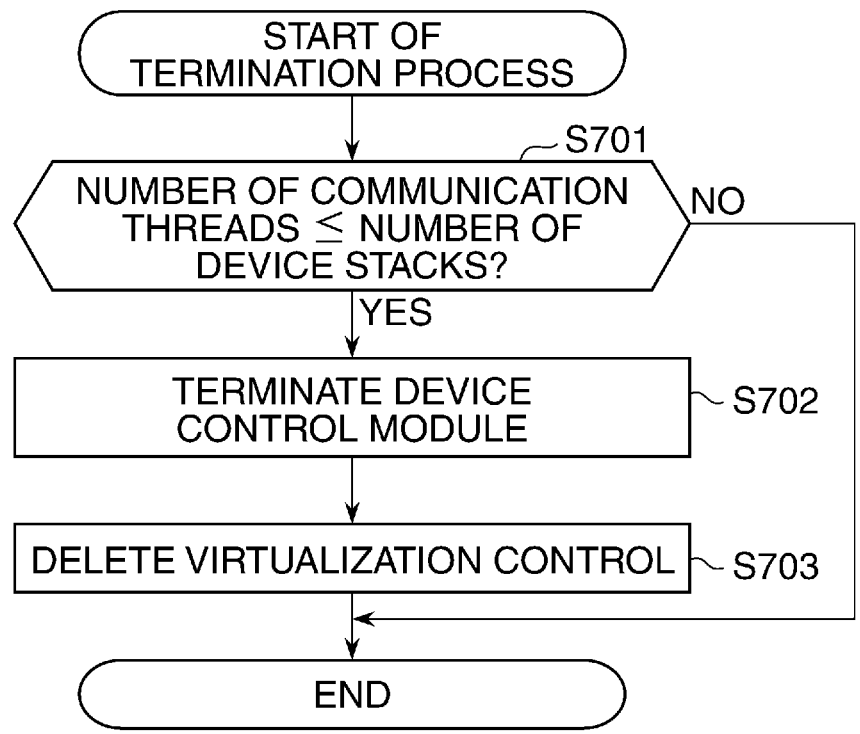
FIG. 7 is a flowchart of a termination process in the communication process shown in FIG. 3.

FIG. 7 is a flowchart of the termination process executed in the step S309 in FIG. 3.

The termination process is executed according to the disconnection request from the external application 11a. The resident module 11b sends a communication thread termination notification ("termination notification") to the main thread 120 according to the received disconnection request, and the main thread 120 instructs an associated communication thread (the communication thread 124, for example) to terminate the same.

Upon receipt of the thread termination instruction, the communication thread 124 compares the number of communication threads being managed by the device server communication module 11c with the number of device stacks, and determines whether or not the number of communication threads is not more than the number of device stacks (step S701).

If the number of communication threads is not more than the number of device stacks (YES to the step S701), the communication thread 124 sends a termination notification to the associated device control module 11d (11d-2 in the present example). The device control module 11d-2 executes a process for terminating the device stack 11f (11f-2 in the present example), and sends a termination process completion event notification to the communication thread 124 (step S702).

Upon receipt of the termination process completion event notification, the communication thread 124 terminates the virtualization control by the device stack 11f-2 to thereby disconnect from the device 13, and terminates (deletes) the device stack 11f-2 (deletes the virtualization control) (step S703).

After sending the termination notification, the resident module 11b sends a process termination notification to the main thread 120, and the main thread 120 having received the process termination notification terminates the communication thread 124.

On the other hand, in the step S701, if the number of communication threads is more than the number of device stacks (NO to the step S701), only the communication thread connected with the device stack 11f-2 is terminated without deleting the device stack 11f-2.

As described above, in the first embodiment of the present invention, the information processing apparatus detects a device stack in the non-data transmission and reception state according to a connection notification, and communicates with a device server via the detected device stack in the non-data transmission and reception state. This makes it possible to control more devices than the maximum connectable devices, while enabling the information processing apparatus to exhibit effective performance without limiting the number of devices to the maximum number of connectable devices defined by the device interface standard or the SDK.

Further, in the first embodiment, when data transmission and reception with a device is terminated, if the number of communication threads becomes less than the number of device stacks, a device stack having been used for the data transmission and reception with the device is deleted, and hence it is possible to reduce consumption of resources of the information processing apparatus by a device stack in the non-data transmission and reception state.

As described above, also in controlling more devices than the maximum connectable devices, it is possible to control and manage the devices by one information processing apparatus, and it is unnecessary to newly provide another information processing apparatus. Therefore, the management of the devices is easy to be executed, and the costs can be reduced.

Next, a description will be given of a device control system using an information processing apparatus according to a second embodiment of the present invention.

The second embodiment differs from the first embodiment in the process executed when a communication thread is terminated, and is characterized in that a device stack is not terminated (deleted) when the communication thread is terminated.

Figure 8:
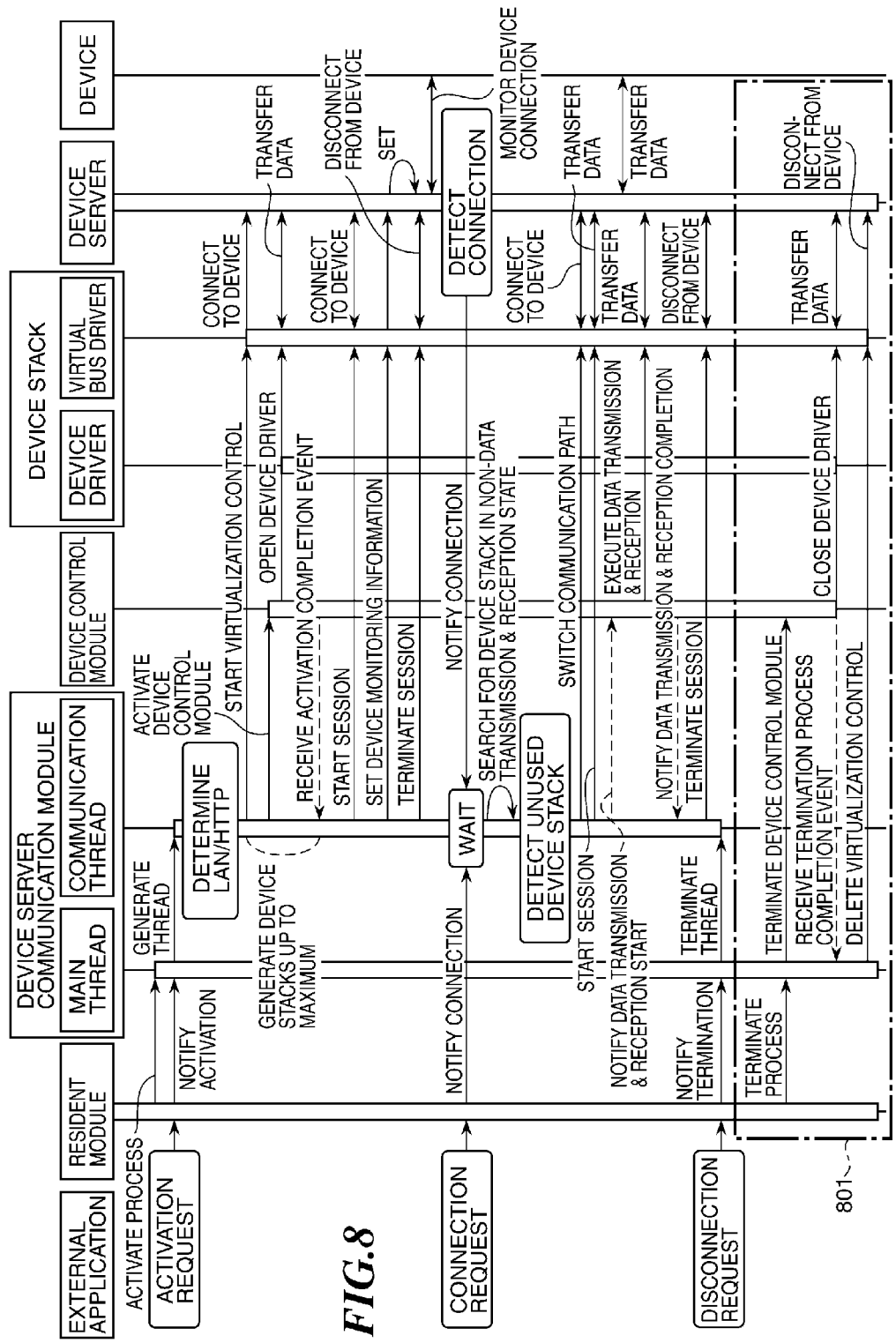
FIG. 8 is a sequence diagram of a data transmission and reception process executed in a device control system according to a second embodiment of the present invention.

Note that the device control system according to the second embodiment has the same configuration as the device control system shown in FIG. 1, and only differs in part of the control in the sequence diagram shown in FIG. 8, surrounded by a thick frame denoted by reference numeral 801, and hence detailed description of the system configuration and the functions of the devices is omitted.

Figure 9:
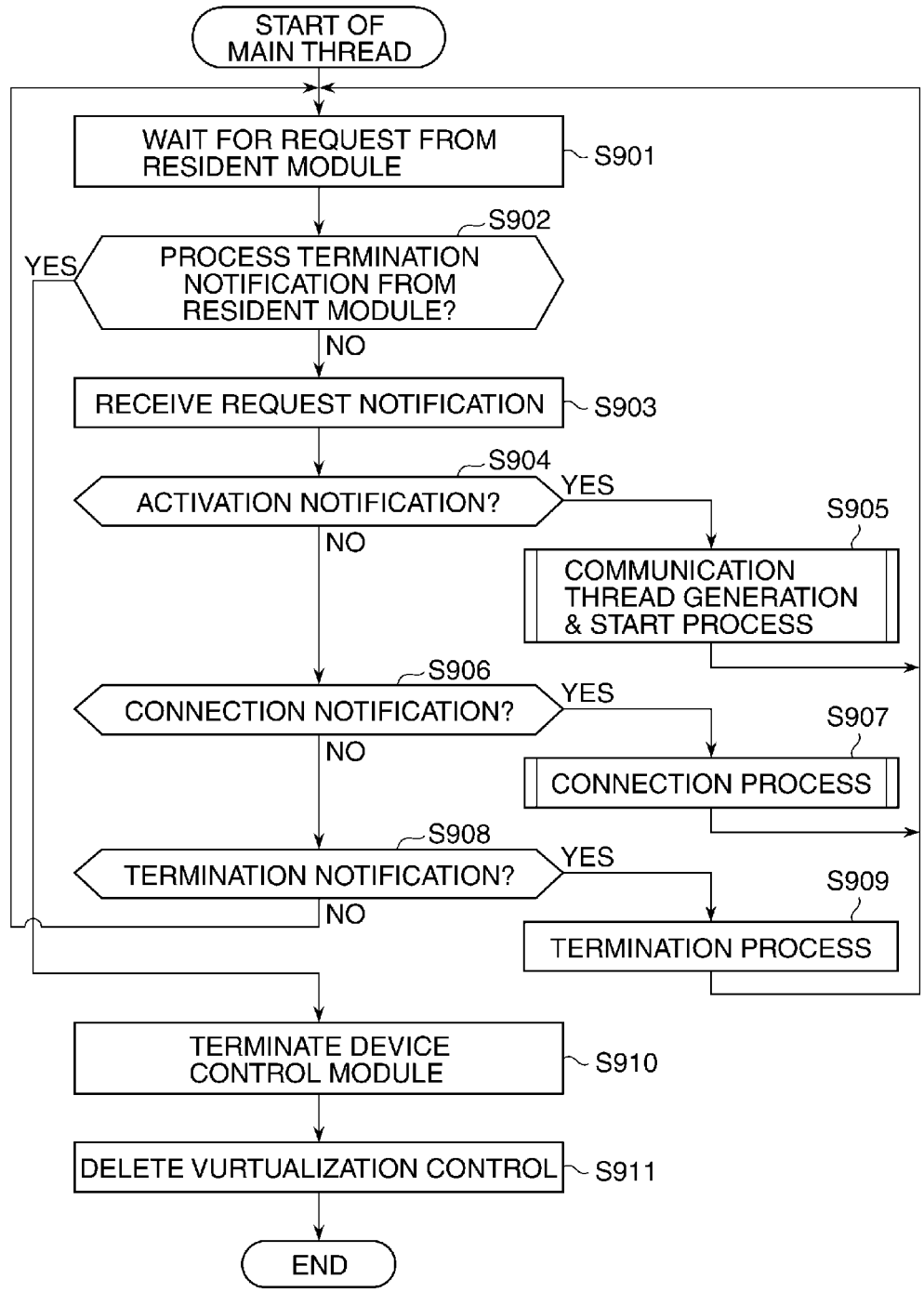
FIG. 9 is a flowchart of a communication process executed by a device server communication module of the information processing apparatus according to the second embodiment.

FIG. 8 is a sequence diagram useful in explaining data transmission and reception in the device control system according to the second embodiment. Further, FIG. 9 is a flowchart of a communication process executed by a device server communication module of the information processing apparatus according to the second embodiment of the present invention.

The communication process in FIG. 9, described hereinafter with reference to FIG. 8, is executed by the main thread 120 of the device server communication module 11c of the information processing apparatus 11 appearing in FIG. 1.

The resident module 11b activates the device server communication module 11c by a process start notification. When the device server communication module 11c is started, the main thread 120 is started, and the main thread 120 enters the wait state waiting for a request (such as an activation request, a connection request, or a termination request) from the resident module 11b (step S901).

Then, if a request from the resident module 11b is received during the wait state, the main thread 120 determines whether or not the request is a process termination notification from the resident module 11b (step S902). If the request is a process termination notification, the process proceeds to a step S910, described hereinafter, whereas if the request is not a process termination notification (NO to the step S902), the main thread 120 receives a notification of a request (such as a start request, a connection request, or a termination request) sent from the external application 11a to the device 13 (step S903). Hereinafter, the above notification of the request is referred to as the request notification.

Next, a process for determining the received request notification is executed. First, the device server communication module 11c determines whether or not the received request notification is an "activation notification" (step S904). If it is determined that the request notification is a "start notification" (YES to the step S904), the main thread 120 executes the same communication thread generation and start process as described with reference to FIG. 4 to generate and start one of the communication threads (121 to 124) which performs independent communication control for each associated one of the device servers (12-1 to 12-4) (step S905). Then, the process returns to the step S901.

If it is determined that the request notification is not an "activation notification" (NO to the step S904), it is determined whether or not the request notification is a "connection notification" (step S906). If the request notification is a "connection notification" (YES to the step S906), the main thread 120 executes the same connection process as described with reference to FIGS. 5 and 6 to cause the associated communication thread to start the connection process (step S907), and the process returns to the step S901.

If the request notification is not a "connection notification" (NO to the step S906), the main thread 120 of the device server communication module 11c determines whether or not the request notification is a "termination notification" (step S908). If the request notification is a "termination notification" (YES to the step S908), the main thread 120 terminates the corresponding communication thread (step S909). At this time, the main thread 120 does not terminate (delete) the associated device stack 11f, and returns to the step S901. That is, the main thread 120 terminates only the communication thread having being used without terminating the associated device stack 11f.

The termination (deletion) of the device stack 11f is executed if a process termination notification is received from the resident module 11b to the main thread 120 of the device server communication module 11c (YES to the step S902).

When the process termination notification is received from the resident module 11b, the main thread 120 of the device server communication module 11c sends a termination notification to the associated device control module 11d (assumed to be the device control module 11d-2 in the present example), and the device control module 11d-2 executes the process for terminating the device stack 11f (assumed to be the device stack 11f-2 in the present example), and sends a termination process completion event notification to the communication thread (step S910).

Upon receipt of the termination process completion event notification, the communication thread (assumed to be the communication thread 124 in the present example) terminates the virtualization control by the device stack 11f-2 to thereby disconnect from the device 13, and terminates (deletes) the device stack 11f-2 (deletes the virtualization control) (step S911).

As described above, also in the second embodiment, the information processing apparatus detects a device stack in the non-data transmission and reception state according to a connection notification, and communicates with a device server via a detected device stack in the non-data transmission and reception state. This makes it possible to more control devices than the maximum connectable devices, while enabling the information processing apparatus to exhibit effective performance without limiting the number of devices to the maximum number of connectable devices defined by the device interface standard or the SDK.

Further, in the second embodiment, when data transmission and reception with a device is terminated, a device stack associated with the data transmission and reception is not terminated (deleted), as a device stack in the non-data transmission and reception state. Therefore, for example, if a communication thread which is waiting for connection exists, it is possible to execute data transmission and reception using the device stack in the non-data transmission and reception state without waiting for a new device stack to be generated.

The number of device stacks in the non-data transmission and reception state may be limited by performing control such that after a device stack is generated, when a predetermined time period has elapsed, the generated device stack is deleted, to thereby reduce consumption of resources of the information processing apparatus.

Next, a description will be given of a device control system using an information processing apparatus according to a third embodiment of the present invention.

Figure 10:
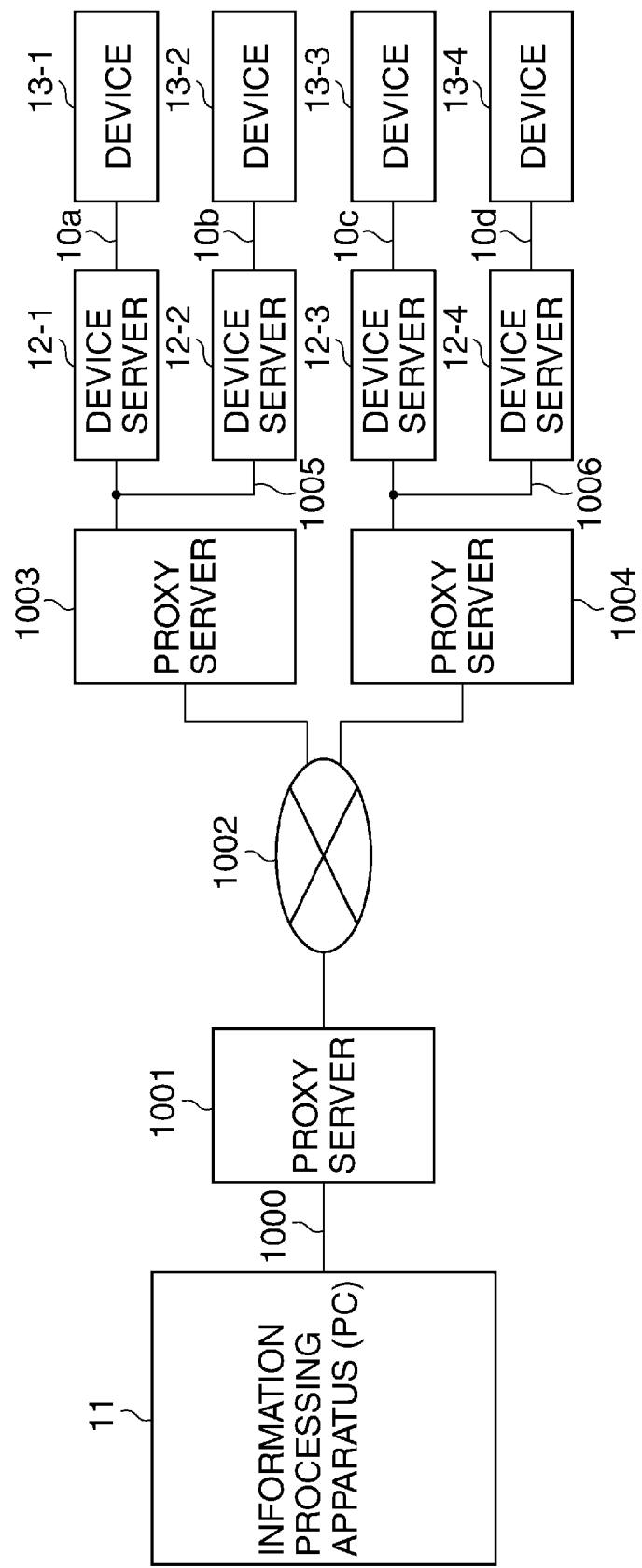
FIG. 10 is a block diagram of a device control system according to a third embodiment of the present invention.

FIG. 10 is a block diagram of the device control system according to the third embodiment of the present invention, which shows a case where the network appearing in FIG. 1 is an external network, such as the Internet.

Note that the information processing apparatus 11 of the device control system in the third embodiment has the same configuration as the information processing apparatus appearing in FIG. 1. In the device control system shown in FIG. 10, the same component elements as those of the device control system shown in FIG. 1 are denoted by the same reference numerals.

In FIG. 10, the information processing apparatus 11 is connected to a proxy server 1001 via a network 1000, such as a LAN. Further, the proxy server 1001 is connected to the external network, such as the Internet (hereinafter referred to as the Internet 1002).

Further, in the illustrated example, proxy servers 1003 and 1004 are connected to the Internet 1002, and the device servers 12-1 and 12-2 are connected to the proxy server 1003 via a network 1005, such as a LAN. Further, the device servers 12-3 and 12-4 are connected to the proxy server 1004 via a network 1006, such as a LAN.

In the present embodiment, the device server communication module 11c included in the information processing apparatus 11 performs control of communication via the Internet connection. The device server communication module 11c communicates with a device server by entering USB packet data generated by a device stack and network packet data for communication with a device server, in a data section defined by a protocol, such as an HTTP (hypertext transfer protocol). This causes the device server communication module 11c to connect to the device server, which is an external server, through a proxy server and a firewall (FW) using the same method as used in connecting to the Web server by a browser.

Note that in a system which connects to an external network, such as the Internet, as described above, system configuration may be performed e.g. using a technique of cloud computing (hereinafter referred to as the cloud), e.g. for a server computer hosting service. By using the cloud, it is possible to provide device servers and devices in the present embodiment on the external network, as desired, and a user can use the devices via a network, such as the Internet, without being conscious of locations of the device servers and devices. As described above, the use of the cloud makes it possible to flexibly configure (change or expand) the system.

As described above, in the present embodiment, even when the information processing apparatus is connected via an external network, such as the Internet, and cannot check the number of devices (and device servers), the information processing apparatus can control, similarly to the first and second embodiments, devices more than the maximum connectable devices defined by the interface standard or the SDK. This makes it possible to control the devices without being conscious of the number of devices (and device servers) connected on the external network.

As is clear from the above description, in the example shown in FIG. 1, the device server communication module 11c (main thread) functions as a communication thread control unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2011-232230, filed Oct. 21, 2011, which is hereby incorporated by reference herein in its entirety.

What is claimed is:

1. An information processing apparatus that is connected via a network to device control units having devices locally or internally connected thereto, comprising:
    a communication thread control unit configured to generate communication threads for controlling data communication with the device control units, according to requests from higher-layer software,
    the communication threads generating device stacks for controlling the devices via the device control units in such a manner as if the devices were directly connected to the information processing apparatus,
    wherein upon receipt of a connection notification indicative of connection with one of the devices, one of the communication threads performs detection of a device stack in a non-data transmission and reception state from the device stacks, and connects to an associated one of the device control units connected to the one of the devices via the detected device stack, to thereby perform data transmission and reception.

2. The information processing apparatus according to claim 1, wherein if no device stack in the non-data transmission and reception state exists, the one of the communication threads waits for connection to the device control unit until a device stack in the non-data transmission and reception state is detected.

3. The information processing apparatus according to claim 1, wherein if as many of the device stacks as defined in advance have been generated, the one of the communication threads does not generate a new device stack.

4. The information processing apparatus according to claim 1, wherein if the number of the device stacks is less than the number defined in advance, the one of the communication threads generates a new device stack.

5. The information processing apparatus according to claim 1, wherein if the number of the device stacks is less than the number defined in advance, the one of the communication threads attempts to detect a device stack in the non-data transmission and reception state, and generates a new device stack when no device stack in the non-data transmission and reception state is detected.

6. The information processing apparatus according to claim 1, wherein when terminating the communication thread, said communication thread control unit compares the number of the communication threads and the number of the device stacks, and if the number of the communication threads is not more than the number of the device stacks, said communication thread control unit terminates a device stack used for connection with the communication thread.

7. The information processing apparatus according to claim 1, wherein when terminating the communication thread, said communication thread control unit compares the number of the communication threads and the number of the device stacks, and if the number of the communication threads is not more than the number of the device stacks, said communication thread control unit does not terminate a device stack used for connection with the communication thread.

8. The information processing apparatus according to claim 1, wherein when terminating the communication thread, said communication thread control unit compares the number of the communication threads and the number of the device stacks, and if the number of the communication threads is more than the number of the device stacks, said communication thread control unit does not terminate a device stack used for connection with the communication thread.

9. A method of controlling an information processing apparatus that is connected via a network to device control units having devices locally or internally connected thereto, comprising:
    generating communication threads for controlling data communication with the device control units, according to requests from higher-layer software,
    causing the communication threads to generate device stacks for controlling the devices via the device control units in such a manner as if the devices were directly connected to the information processing apparatus; and
    causing, upon receipt of a connection notification indicative of connection with one of the devices, one of the communication threads to perform detection of a device stack in a non-data transmission and reception state from the device stacks, and connect to an associated one of the device control units connected to the one of the devices via the detected device stack in the non-data transmission and reception state, to thereby perform data transmission and reception.

10. The method according to claim 9, further comprising, if no device stack in the non-data transmission and reception state exists, causing the one of the communication threads to wait for connection to the device control unit until a device stack in the non-data transmission and reception state is detected.

11. The method according to claim 9, wherein if as many of the device stacks as defined in advance have been generated, the one of the communication threads does not generate a new device stack.

12. The method according to claim 9, wherein if the number of the device stacks is less than the number defined in advance, the one of the communication threads generates a new device stack.

13. The method according to claim 9, wherein if the number of the device stacks is less than the number defined in advance, the one of the communication threads attempts to detect a device stack in the non-data transmission and reception state, and generates a new device stack when no device stack in the non-data transmission and reception state is detected.

14. The method according to claim 9, further comprising, when terminating the communication thread, comparing the number of the communication threads and the number of the device stacks, and if the number of the communication threads is not more than the number of the device stacks, terminating a device stack used for connection with the communication thread.

15. The method according to claim 9, further comprising, when terminating the communication thread, comparing the number of the communication threads and the number of the device stacks, and if the number of the communication threads is not more than the number of the device stacks, not terminating a device stack used for connection with the communication thread.

16. The method according to claim 9, further comprising, when terminating the communication thread, comparing the number of the communication threads and the number of the device stacks, and if the number of the communication threads is more than the number of the device stacks, not terminating a device stack used for connection with the communication thread.

\* \* \* \* \*